(12) United States Patent
Haswell

(10) Patent No.: US 8,037,532 B2
(45) Date of Patent: Oct. 11, 2011

(54) APPLICATION PROTECTION FROM MALICIOUS NETWORK TRAFFIC

(75) Inventor: Jonathan Haswell, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 849 days.

(21) Appl. No.: 11/954,187

(22) Filed: Dec. 11, 2007

(65) Prior Publication Data

US 2009/0150996 A1 Jun. 11, 2009

(51) Int. Cl.
G06F 21/00 (2006.01)
G06F 11/30 (2006.01)
G06F 15/16 (2006.01)

(52) U.S. Cl. .......................... 726/23; 709/224
(58) Field of Classification Search .................. None
See application file for complete search history.

(56) References Cited

U.S. PATENT DOCUMENTS

| | | | | |
|---|---|---|---|---|
| 6,088,804 A * | 7/2000 | Hill et al. | | 726/25 |
| 6,119,236 A * | 9/2000 | Shipley | | 726/22 |
| 6,304,975 B1 * | 10/2001 | Shipley | | 726/22 |
| 6,519,703 B1 * | 2/2003 | Joyce | | 726/22 |
| 6,735,702 B1 * | 5/2004 | Yavatkar et al. | | 726/13 |
| 7,159,237 B2 * | 1/2007 | Schneier et al. | | 726/3 |
| 7,222,366 B2 * | 5/2007 | Bruton et al. | | 726/23 |
| 7,565,549 B2 * | 7/2009 | Satterlee et al. | | 713/187 |
| 7,640,591 B1 * | 12/2009 | Tripathi et al. | | 726/25 |
| 7,739,736 B1 * | 6/2010 | Tripathi et al. | | 726/22 |
| 7,809,131 B1 * | 10/2010 | Njemanze et al. | | 380/2 |
| 7,895,649 B1 * | 2/2011 | Brook et al. | | 726/22 |
| 2004/0059943 A1 | 3/2004 | Marquet et al. | | |
| 2004/0143751 A1 | 7/2004 | Peikari | | |
| 2005/0108434 A1 | 5/2005 | Witchey | | |
| 2006/0206936 A1 | 9/2006 | Liang et al. | | |
| 2006/0253902 A1 | 11/2006 | Rabadan et al. | | |
| 2006/0256716 A1 | 11/2006 | Caci | | |
| 2006/0288411 A1 * | 12/2006 | Garg et al. | | 726/22 |
| 2007/0056038 A1 * | 3/2007 | Lok | | 726/23 |
| 2009/0241190 A1 * | 9/2009 | Todd et al. | | 726/23 |

OTHER PUBLICATIONS

Susilo, W. et al., "Personal Firewall for Pocket Pc 2003: Design & Implementation," 19th Int. Conf. on Adv. Inf. Networking and Appl., Part vol. 2 pp. 661-666, Mar. 2005.

Huang, Q. et al., "An Embedded Firewall Based on Network Processor," 2nd International Conference on Embedded Software and Systems, p. 7, Dec. 2005.

(Continued)

*Primary Examiner* — Christopher Revak
(74) *Attorney, Agent, or Firm* — Cantor Colburn LLP; Feb Cabrasawan

(57) ABSTRACT

A program, method and system for embedding a programmable packet filter into an application to protect the application against malicious network packets are disclosed. Traditional packet filtering techniques to protect against malicious packets designed to exploit defects in applications, based on external packet filtering devices create a bottleneck in network traffic and present a large overhead cost. In addition, when security vulnerabilities in applications are discovered, traditional application updating methods lack a fast enough turn-around time to protect the application and users data from attack. These problems can be overcome by embedding a programmable packet filter into the application itself. The application can use the filter to discard malicious network packets. Furthermore, the filter can be updated via configuration files downloaded from the application vendor to update the application's embedded programmable packet filter without having to update the entire program code of the application.

20 Claims, 8 Drawing Sheets

OTHER PUBLICATIONS

Ihde, M. et al., "Barbarians in the Gate: An Experimental Validation of Nic Based Distributed Firewall Performance and Flood Tolerance," Int. Conf. on DSN, p. 6, Jun. 2006.

Guo et al., "An Embedded Firewall System Design Based on Ptolemy II," Journal of System Simulation, vol. 16 No. 6 pp. 1361-1363, Jun. 2004.

* cited by examiner

APPLICATION PROTECTION FROM MALICIOUS NETWORK TRAFFIC

BACKGROUND OF THE INVENTION

1. Field of the Invention

This invention relates to computer network security. Particularly, this invention relates to protecting computers in a network from malicious network traffic using programmable packet filters.

2. Description of the Related Art

Most large software applications written in languages such as C or C++ have a number of potential security flaws in them. In many cases, malicious packets crafted by a remote attacker can either crash the application or, as is becoming more common, take over the application and allow the hacker to execute his own malicious code. The latter is facilitated by a number of freely available frameworks enabling this form of attack.

In response, the conventional wisdom among application developers is to review their code to try and reveal dangerous programming practices that may allow maliciously crafted packets to overflow buffers and to test for this type of vulnerability. Another technique uses "fuzzers" which semi-randomly create packets to try and expose programming errors in handling such packets. However, both these activities are imperfect, as they are susceptible to human error allowing vulnerabilities in the software to remain.

In addition, there is an increasing demand that application vendors respond rapidly with patches when such vulnerabilities arise. However, this can be difficult, as the time to fix an application, test the fix and then deploy it can be excessive and provide a window for hackers to exploit the vulnerability. To help cover this period of vulnerability, an industry has emerged that provides specialized firewalls for all traffic to pass through, prior to reaching the application. These firewalls are programmable hardware devices that can typically be configured on the fly to identify potentially dangerous packets and discard these packets before they reach the application. However, these specialized devices have some shortcomings.

All network traffic has to be routed through such firewalls and thus they present a network bottleneck. Care must also be taken that all key application servers are positioned behind such firewall devices. This can be a particular problem if one is trying to protect a large number of servers in branch offices, for example.

In addition, such firewall devices are expensive to procure as a service contract is usually also required to update these boxes with the digital signatures of malicious packets. Moreover, users pay for the protection they provide to hundreds of different applications, even if in a particular installation only employs one or two applications. For example, a user may pay for the overhead of companies such as ISS, TippingPoint or iDefense to collect information on all vulnerabilities across all enterprise products.

Finally, such firewall devices are typically only implemented as a stop-gap solution between the time when a vulnerability is detected and when an application vendor releases a true fix and it is deployed by their customers after suitable regression testing. Whenever a vulnerability is detected in a product the vendor and customers have to go through the time and expense of putting a new version of the product into service.

FIG. 1A illustrates a system of computers 100 that uses the current method of protecting against malicious packets. The computers 102A-102C each contains multiple applications 104A-104I that are accessed via a wider network, identified as the internet 106. Between the applications 104A-104I and the internet 106 is the firewall device 108. The firewall 108 is the tool used to protect the applications from malicous packets designed to crash or exploit the applications security vulnerabilities. The protective nature of the firewall 108 is represented by the broken border pattern. All of the computers 102A-102C are connected to the firewall 108, and the firewall 108 connects to the internet 106. The described bottleneck is illustrated as there are connections to the firewall 108 from the computers 102A-102C and only one connection on the opposite side to the internet 106. Some different security techniques for protecting computers from connections to unprotected networks have been developed.

U.S. Patent Application Publication No. 2006/0256716 by Caci, published Nov. 16, 2006, discloses an electronic communication control device suitable for embedding into a network interface card or a line card of a switch or router. The electronic communication control device is capable of communications in multiple protocols. The processing architecture of the electronic communication control device may be adapted for any communications protocol and may be well suited for Internet protocol. The electronic communication control device may perform protocol translation, for example, between IPv4 and IPv6. An exemplary embodiment of the electronic communication control device includes a parallel processing chipset operating on multiple busses with embedded software. The electronic communication control device provides a hardware architecture upon which embedded software may operate to provide services, such as, for example, system control, packet analysis, packet filtering, translation services, switching, routing and/or multiplexing control.

U.S. Patent Application Publication No. 2006/0253902 by Rabadan et al., published Nov. 9, 2006, discloses a method, system and apparatus for filtering data packets through an integrated network security device. Various security operations are performed on the data packets belonging to a network connection while they pass through the integrated network security device in a communication network. A classification engine is applied to the first packet of the connection. The result of this filtering is stored in a per-connection control key, and determines which of the security operations must be applied to each of the data packets of the connection. These security operations may be prioritized and re-ordered, based on the rate at which they detect and drop malicious data packets.

U.S. Patent Application Publication No. 2006/0206936 by Liang et al., published Sep. 14, 2006, discloses that in one embodiment, a network security appliance includes a logic circuit, a network processing unit, and a general purpose processor to protect a computer network from malicious codes, unauthorized data packets, and other network security threats. The logic circuit may include one or more programmable logic devices configured to scan incoming data packets at different layers of a multi-layer protocol, such as the OSI-seven layer model. The network processing unit may work in conjunction with the logic circuit to perform protocol parsing, to form higher layer data units from the data packets, and other network communications-related tasks. The general purpose processor may execute software for performing functions not available from the logic circuit or the network processing unit. For example, the general purpose processor may remove malicious code from infected data or perform malicious code scanning on data when the logic circuit is not configured to do so.

U.S. Patent Application Publication No. 2005/0108434 by Witchey, published May 19, 2005, discloses a method and embedded system for connecting a legacy device to a network are provided. The system includes a firewall module that can be configured by embedded system firmware to filter data packets when data packets do not match pre-determined rules; determines if data is intended for an allowed port; and discards data if data is not for an allowed port or an allowed address. If address and data port are allowed, then data is transmitted to the network. The method includes, determining if a data packet is from an allowed address, wherein an embedded system coupled to the legacy device uses a firewall module to filter data packets when data packets do not match pre-determined rules; determining if data is intended for an allowed port; and discarding data if data is not for an allowed port or an allowed address.

U.S. Patent Application Publication No. 2004/0143751 by Peikari, published Jul. 22, 2004, discloses a method and apparatus for increasing the security of data processing devices that use embedded operating systems (embedded devices). This invention utilizes an "embedded firewall" that improves security of the device by selectively filtering communication directly on the embedded device itself, rather than relying on an external firewall. In a preferred embodiment, this is achieved by (1) entering the desired filter specification at the user layer using an embedded user interface (UI) program or an imported specification file, (2) compiling the specification to be subsequently used by the embedded filtering engine, (3) using an embedded dynamic link library (DLL) as an intermediary to isolate the user program from the lower kernel level, thus providing a system-independent interface, (4) communicating the specification to the kernel layer using the embedded DLL, (5) monitoring packets in the kernel level as they enter from the lower network level using an embedded packet driver, (6) filtering packets at the kernel level using the embedded filtering engine and the previously defined filter specification, (7) reporting the results from the kernel level back up to the user level through the embedded DLL.

U.S. Patent Application Publication No. 2004/0059943 by Marquet et al., published Mar. 25, 2004, discloses a packet filter for filtering data packets in a communications network. The packet filter has input and output ports for receiving and transmitting respective data packets. A data filter selectively passes packets from the input port to the output port in accordance with filtering policies. A policy manager determines filtering policies and controls operation of the data filter. The policy manager is independent of its implementation and not related to any particular operating system. This independence allows for a generic path of managing policies across devices implementing a system and for more flexibility in the implementation of packet filters. Flexibility may be enhanced by implementing the policy manager in system-on-chip technology.

In view of the foregoing, there is a need for systems and methods to protect applications from received malicious packets that operate efficiently without creating a network bottleneck. Further, there is a need for such systems and methods to provide protection for computer applications that receive packets without having to develop a new version of the application. There is also a need for such systems and methods to be quickly updated to protect against new threats. These and other needs are met by the present invention as detailed hereafter.

SUMMARY OF THE INVENTION

A program, method and system are disclosed for embedding a programmable packet filter into an application to protect the application against malicious network packets. Traditional packet filtering techniques create a bottleneck in network traffic and present a large overhead cost. In addition, traditional application updating methods lack a fast enough turn-around time to address security vulnerabilities. These problems can be overcome by embedding a programmable packet filter into the application itself. The application can use the filter to discard malicious network packets. Furthermore, the filter can be updated via configuration files downloaded from the application vendor to update the application's embedded programmable packet filter without having to update the entire program code of the application.

A typical embodiment of the invention comprises a computer program embodied on a computer readable medium including program instructions for receiving network packets within an application, program instructions for filtering the network packets with a programmable packet filter embedded in the application to identify whether the network packets are malicious packets, and program instructions for allowing only the network packets not identified as the malicious packets to be processed by the application. Filtering the network packets may be performed by examining the network packets for one or more digital signatures corresponding to the malicious packets. In addition, the programmable packet filter may be implemented in a separate process from the application, but launched from the application.

Further embodiments of the invention include program instructions for programming the programmable packet filter using configuration files. The configuration files may comprise one or more digital signatures corresponding to the malicious packets to be applied in filtering the network packets. Furthermore, programming with the configuration files may be implemented using a pseudo-machine program.

In addition, embodiments of the invention may also include program instructions for loading the configuration files from an external source. For example, the external source may be connected to the application via internet or connected to the application via a local network.

In a similar manner, a typical method embodiment of the invention comprises receiving network packets within an application, filtering the network packets with a programmable packet filter embedded in the application to identify whether the network packets are malicious packets, and allowing only the network packets not identified as the malicious packets to be processed by the application. Method embodiments of the invention may be further modified consistent with program and system embodiments as described herein.

In addition, a typical system embodiment of the invention comprised a network connection for receiving network packets within an application, and a processor for filtering the network packets with a programmable packet filter embedded in the application to identify whether the network packets are malicious packets and allowing only the network packets not identified as the malicious packets to be processed by the application. A memory for storing configuration files for programming the programmable packet filter may also be used such that the configuration files comprise one or more digital signatures corresponding to the malicious packets to be applied in filtering the network packets. System embodiments of the invention may be further modified consistent with program and method embodiments as described herein.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

Embodiments of the invention integrate the logic of a programmable packet filter to detect malicious packets into a software application. The integrated packet filter can be programmed via configuration files downloaded from the application vendor. The downloading may occur automatically in some embodiments. Because the packet filter is part of the application logic many advantages are obtained. It should be noted that as used herein, an application (or software application) refers to a program, running to perform some specific functionality, such as a database or business application. Accordingly, running such an application requires an operating system with associated device drivers etc., however, these components are not considered to be part of the application.

Thus, a vendor can supply an update to the filter configuration in a very short time to close any new vulnerability. The time required to create a new filter for a new type of malicious packet is much shorter than the time that would otherwise be required to produce an update to the entire application. In the latter case, there is a considerable time cost associated with changing the logic of the application, rebuilding it, and retesting it. In comparison, an updated filter can be distributed more quickly because the entire application does not need to be affected. In addition, in order to update an entire application, the program instructions of the application must be studied to protect against the malicious packet. In contrast, when a filter is updated, the malicious packet will not ever reach the program instructions, so there is no need to reexamine the program instructions of the application.

Because the overhead of running the packet filter in the application is relatively small, compared to a general purpose box that filters all network traffic, an update to a programmable filter in an application can be a much better solution. If all of the application filters are updated diligently, then there will be no need for a firewall.

In addition, because updating the programmable filter can be a complete solution for a vulnerability, the vendor does not have to build patched versions of all update versions of their product and the customers do not have to upgrade the version of the product they are running to fix a security vulnerability. This is particularly important for large scale enterprise applications where a software upgrade requires a great degree of associated testing before deployment that is disruptive to operations and very expensive.

Furthermore, because the protection of a programmable filter is embedded directly in the application where it is needed, there is no requirement to ensure all servers are behind the protection of the dedicated packet filtering devices.

Figure 1A:
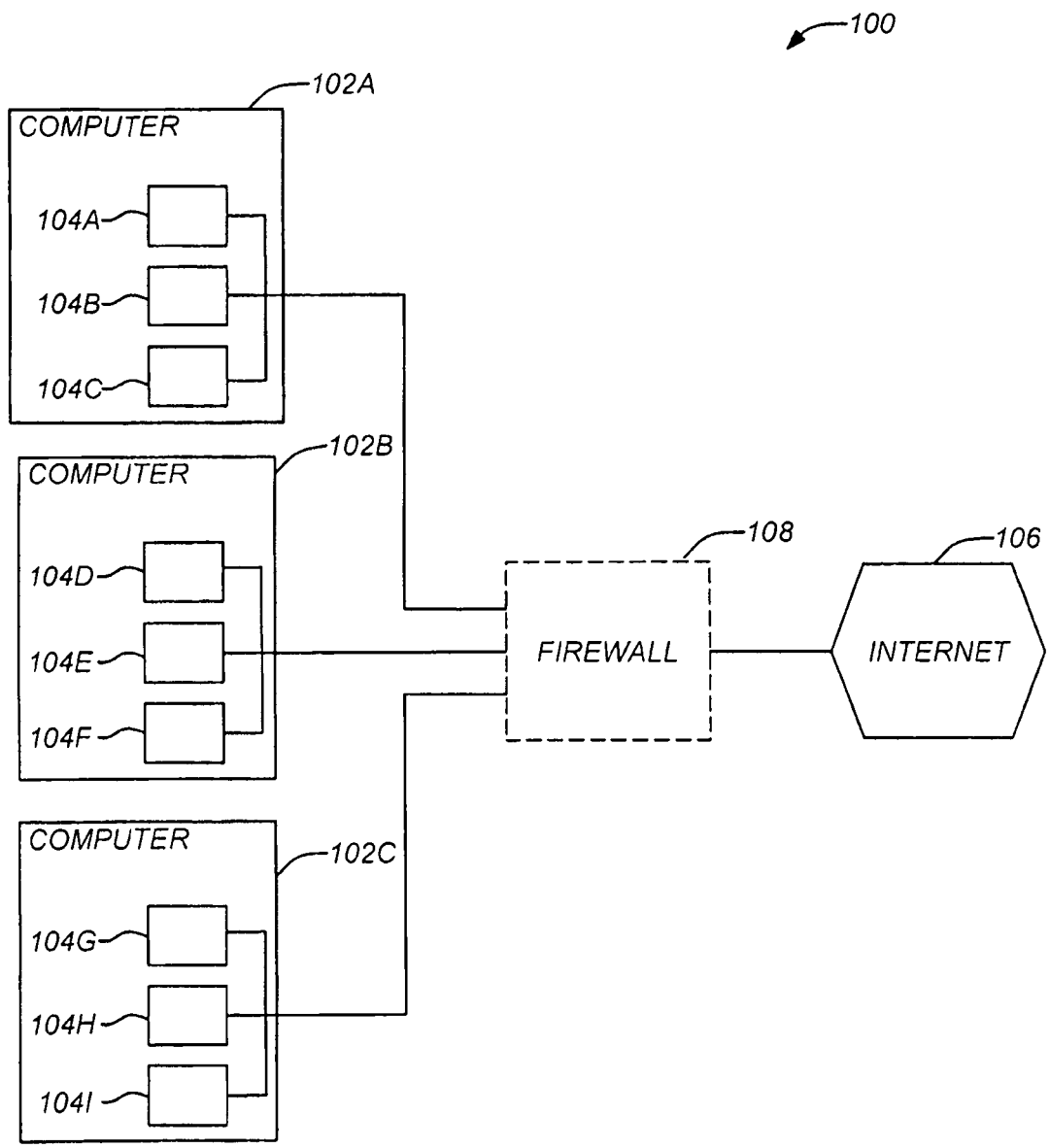
FIG. 1A illustrates a conventional layout of a computer system that has access to a server and is protected by a firewall.
Figure 1B:
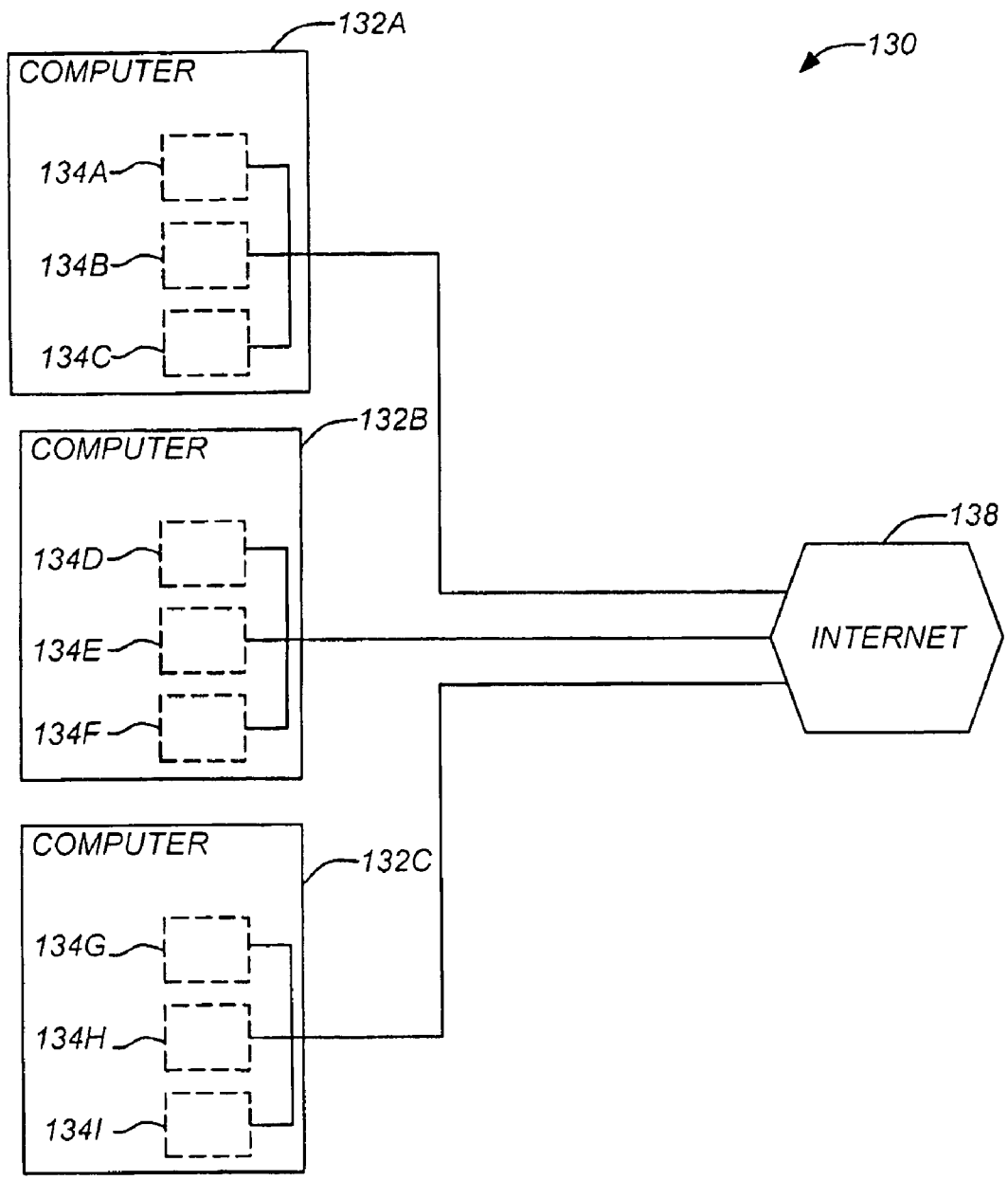
FIG. 1B illustrates an exemplary implementation of the invention in a computer system that has access to a server.

FIG. 1B illustrates an exemplary implementation of the invention. The system 130 includes computers 132A-132C and applications 134A-134I. This system 130 does not require a firewall however. Instead, the system 130 employs filters 136A-136I within each application. The protective nature of the embedded filters 136A-136I is represented by the broken border pattern of the applications 134A-134I. The computers 132A-132C are each able to connect directly to the internet 138 safely as received packets are appropriately filtered by the filters 136A-136I of the respective applications 134A-134I. Thus, the bottleneck created by the conventional firewall is eliminated.

2. Hardware Environment

Figure 2A:
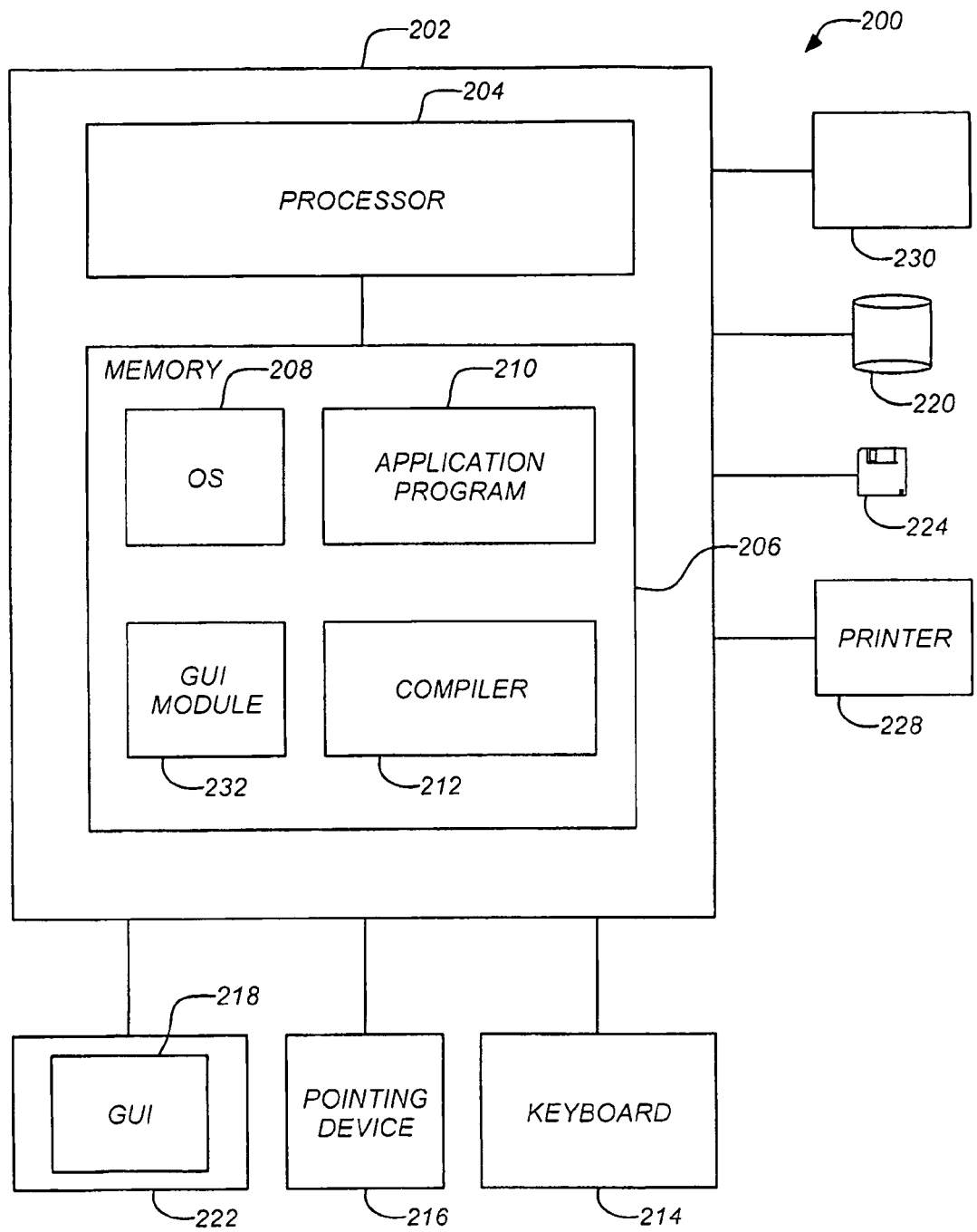
FIG. 2A illustrates a hardware environment that can be used to implement an embodiment of the invention.

FIG. 2A illustrates an exemplary computer system 200 that can be used to implement embodiments of the present invention. The computer 202 comprises a processor 204 and a memory 206, such as random access memory (RAM). The computer 202 is operatively coupled to a display 222, which presents images such as windows to the user on a graphical user interface 218. The computer 202 may be coupled to other devices, such as a keyboard 214, a mouse device 216, a printer 228, etc. Of course, those skilled in the art will recognize that any combination of the above components, or any number of different components, peripherals, and other devices, may be used with the computer 202.

Generally, the computer 202 operates under control of an operating system 208 (e.g. z/OS, OS/2, LINUX, UNIX, WINDOWS, MAC OS) stored in the memory 206, and interfaces with the user to accept inputs and commands and to present results, for example through a graphical user interface (GUI) module 232. Although the GUI module 232 is depicted as a separate module, the instructions performing the GUI functions can be resident or distributed in the operating system 208, a computer program 210, or implemented with special purpose memory and processors.

The computer 202 also implements a compiler 212 which allows one or more application programs 210 written in a programming language such as COBOL, PL/1, C, C++, JAVA, ADA, BASIC, VISUAL BASIC or any other programming language to be translated into code that is readable by the processor 204. After completion, the computer program 210 accesses and manipulates data stored in the memory 206 of the computer 202 using the relationships and logic generated using the compiler 212. The computer 202 also optionally comprises an external data communication device 230 such as a modem, satellite link, ethernet card, wireless link or other device for communicating with other computers, e.g. via the Internet or other network.

Instructions implementing the operating system 208, the computer program 210, and the compiler 212 may be tangibly embodied in a computer-readable medium, e.g., data storage device 220, which may include one or more fixed or removable data storage devices, such as a zip drive, floppy disc 224, hard drive, DVD/CD-ROM, digital tape, etc., which are generically represented as the floppy disc 224. Further, the operating system 208 and the computer program 210 comprise instructions which, when read and executed by the computer 202, cause the computer 202 to perform the steps necessary to implement and/or use the present invention. Computer program 210 and/or operating system 208 instructions may also be tangibly embodied in the memory 206 and/or transmitted through or accessed by the data communication device 230. As such, the terms "article of manufacture," "program storage device" and "computer program product" as may be used herein are intended to encompass a computer program accessible and/or operable from any computer readable device or media.

Embodiments of the present invention are generally directed to any software application program 210 that receives packets from a network as it operates, e.g., as described in the system 130 of FIG. 1B. The program 210 may operate within a single computer 202. Some example applications include, but are not limited to, databases applications (e.g., DB2 or Oracle), ERP applications such as SAP or backup and archiving products such as IBM's Tivoli Storage Manager. The network may encompass one or more computer devices and/or storage devices connected via the Internet connection (which may be public or secure, e.g. through a VPN connection) as illustrated in the exemplary distributed computer system 250 of FIG. 2B.

Figure 2B:
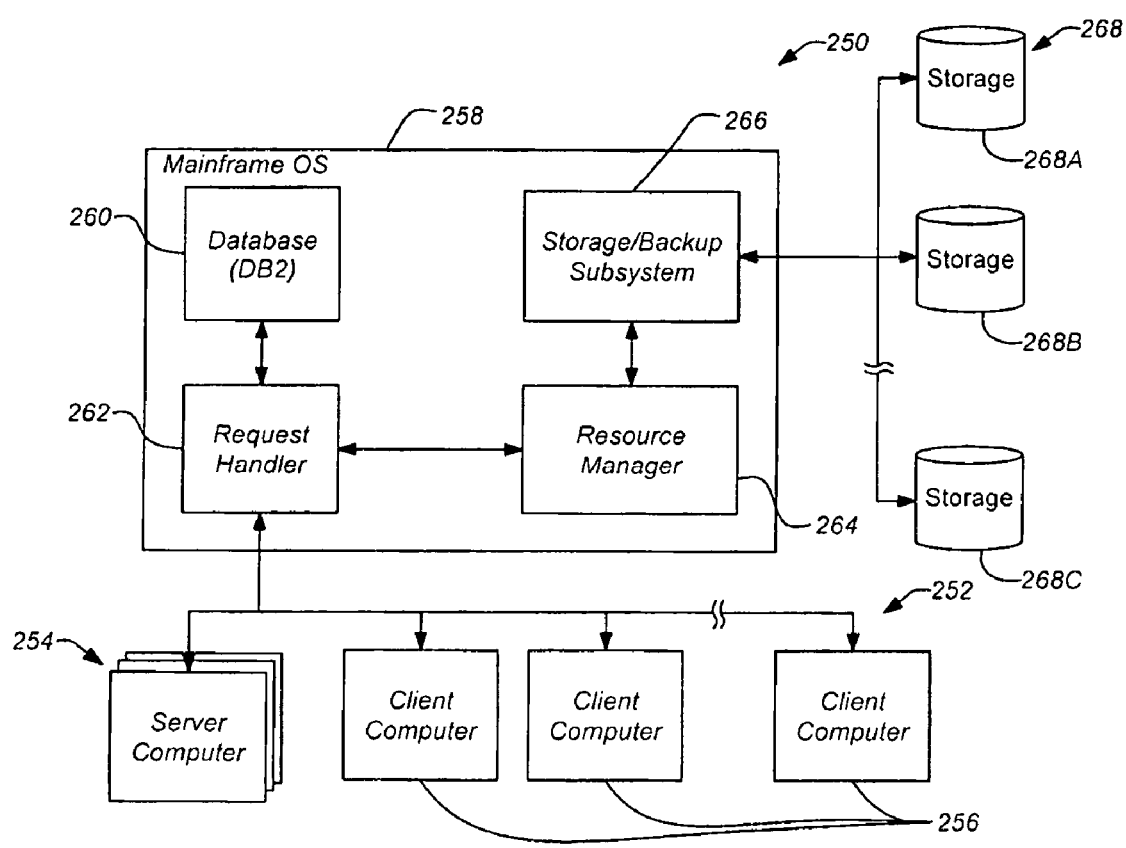
FIG. 2B illustrates a typical distributed computer system which may be employed with a typical embodiment of the invention.

FIG. 2B illustrates a typical distributed computer system 250 which may be employed with a typical embodiment of the invention. Such a system 250 comprises a plurality of computers 202 which are interconnected through respective communication devices 230 in a network 252. The network 252 may be entirely private (such as a local area network within a business facility) or part or all of the network 252 may exist publicly (such as through a virtual private network (VPN) operating on the Internet). Further, one or more of the computers 202 may be specially designed to function as a server or host 254 facilitating a variety of services provided to the remaining client computers 256. In one example, one or more hosts may be a mainframe computer 258 where significant processing for the client computers 256 may be performed. The mainframe computer 258 may comprise a database 260 which is coupled to a request handler 262 which implements a number of database procedures for other networked computers 202 (servers 254 and/or clients 256). The request handler 262 is also coupled to a resource manager 264 which directs data accesses through storage/backup subsystem 266 that facilitates accesses to networked storage devices 268 comprising a SAN. Thus, the storage/backup subsystem 266 on the computer 258 comprises the backup server which manages backup data objects from the client computers 256 stored on networked storage devices 268 in a distributed storage system. The SAN may include devices such as direct access storage devices (DASD) optical storage and/or tape storage indicated as distinct physical storage devices 268A-268C. Various known access methods (e.g., VSAM, BSAM, QSAM) may function as part of the storage/backup subsystem 266.

Those skilled in the art will recognize many modifications may be made to this hardware environment without departing from the scope of the present invention. For example, those skilled in the art will recognize that any combination of the above components, or any number of different components, peripherals, and other devices, may be used with the present invention meeting the functional requirements to support and implement various embodiments of the invention described herein.

3. Programmable Packet Filter

Packet filtering is the basic concept that drives most programs used to protect computers from malicious packets encountered while using unprotected networks such as the internet. Packets are the basic unit of data transfer for computers accessing a server via the internet, and thus, are filtered in order to protect the client computer from receiving a packet that contains a virus or other malicious computer code. A malicious packet is designed to crash or facilitate the taking over of an application. The end result of a malicious packet and a virus are much the same, however a virus typically refers to a malicious program that runs on a computer. Embodiments of the invention protect against a maliciously constructed data packet on the network (which may be used to trigger the running of a virus but is not typically described as a virus itself). A packet filter compares the incoming packet with its set of rules for which packets to allow and which packets to discard. The ones that are allowed continue to the program that requested them, and the ones that match the filter are discarded. The filter for packets is determined by not only the code within the packet, but also by the source of the packet.

Figure 3A:
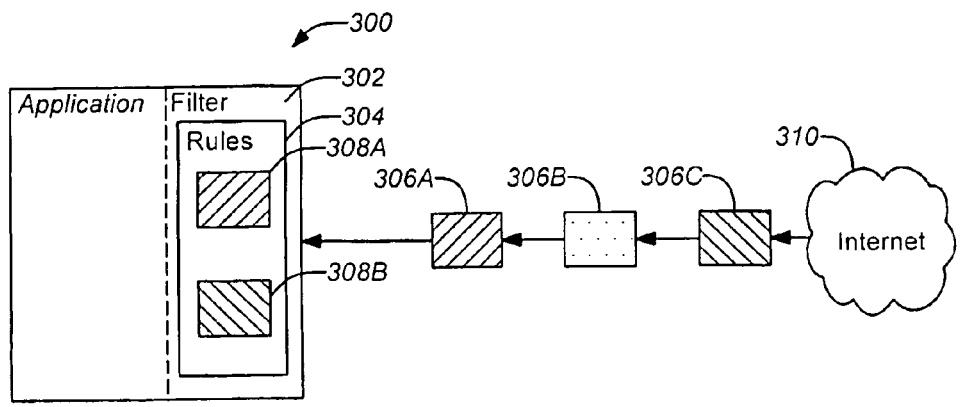
FIG. 3A illustrates a packet filter ready to receive a string of three network packets.
Figure 3B:
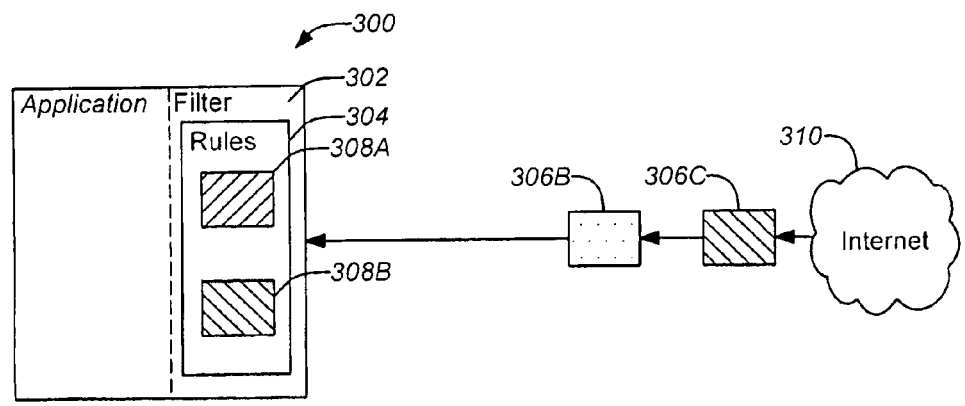
FIG. 3B illustrates a packet filter after processing one of the network packets.
Figure 3C:
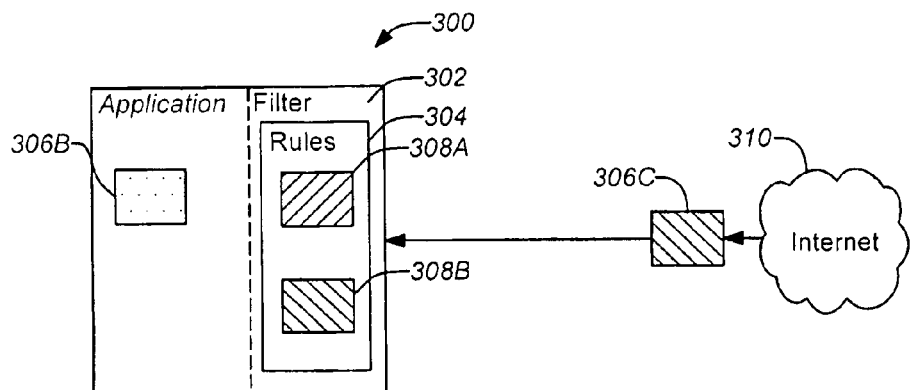
FIG. 3C illustrates a packet filter after processing two of the network packets.

FIG. 3A illustrates an exemplary process of packet filtering. The programmable packet filter 300 of an application 302 has a set of rules 304 to be followed that include one or more digital signatures 308A, 308B for which an incoming series of network packets 306A-306C from the internet 310 are scanned. The application 302 has requested network packets 306A-306C (or is sent packets under other conditions in the ordinary operation of the application). In this example, the network packets 306A-306C having signatures that match the signatures 308A, 308B in the rules 304 of the programmable packet filter 300 must be discarded. These signatures are represented by the digital patterns on the network packets 306A-306C. The first network packet 306A matches the pattern of the digital signature 308A in the rules 304 and must be discarded because it is determined to be an unsafe packet. FIG. 3B shows the packet 306A discarded as the application 300 has not received it. The second network packet 306B does not match a pattern in the rules 304, and is assumed to be a safe packet. It is allowed to be processed by the application 300, as shown in FIG. 3C. Finally, the third network packet 306C includes a pattern 308B matching one in the rules 304, and is discarded just as the first packet 306A was.

4. Pseudo Machine Implementation

As previously discussed, an exemplary implementation of the invention includes embedding a programmable packet filter into an application, as opposed to a separate device such as a firewall.

Figure 4A:
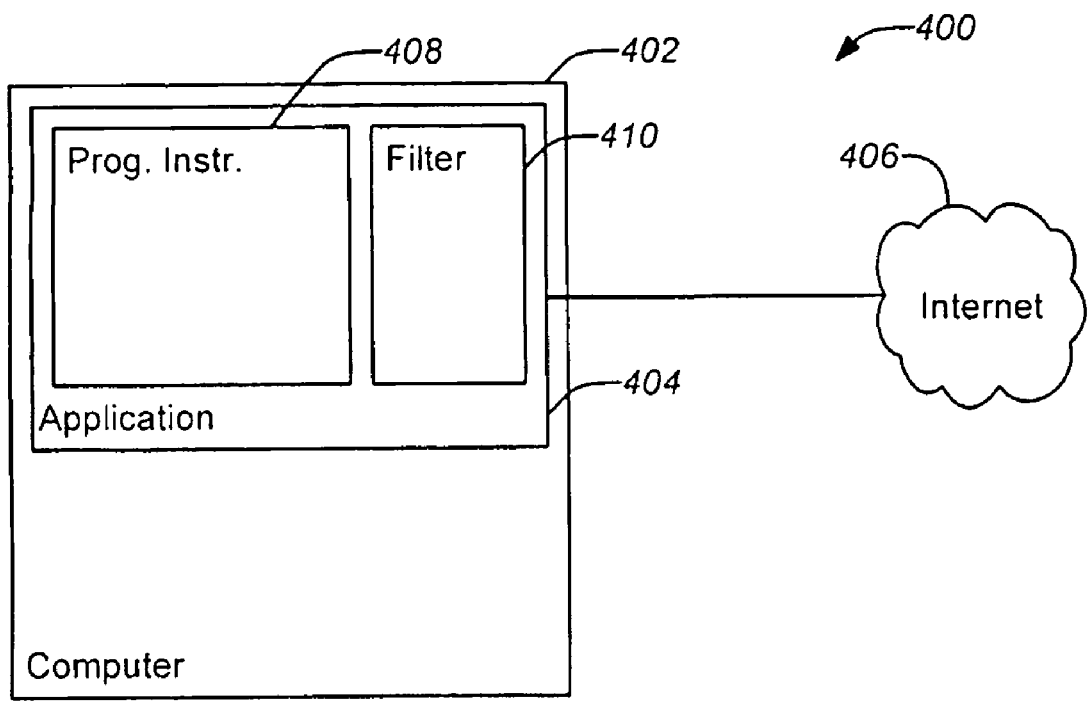
FIG. 4A illustrates the layout of a computer system that uses an exemplary implementation of the invention.

FIG. 4A illustrates a layout of the components of a computer system 400 using an exemplary implementation of the invention. Within the computer 402 there is an application 404 that has access to the internet 406. Further, the application 404 comprises the program instructions 408 and a programmable packet filter 410. Note that the programmable packet filter may be typically implemented as a set of computer instructions, just as the rest of the application is. Accordingly, the programmable packet filter is one component of the overall application distributed to the end user (which is internally divided between the programmable packet filter and the remainder of the application). As previously described, this programmable packet filter 410 within the application 404 operates to screen all incoming network packets for one or more digital signatures that are indicative of malicious packets (e.g., a virus).

Figure 4B:
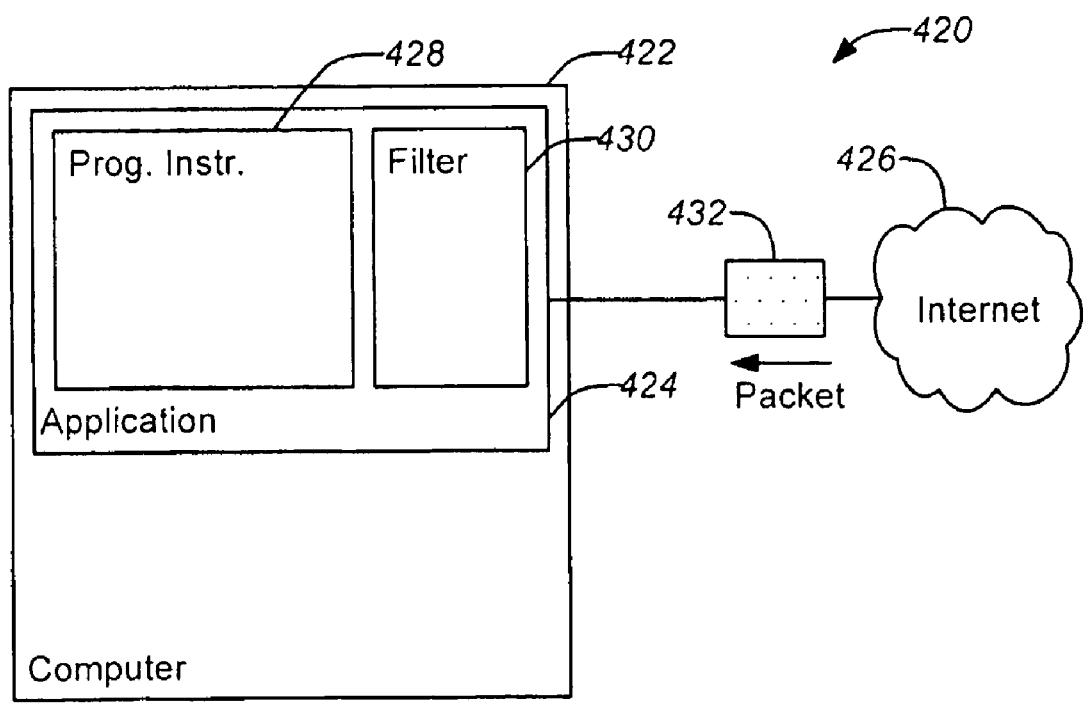
FIG. 4B illustrates a network packet from the internet being downloaded by the computer.

FIG. 4B illustrates a computer system 420 with packet 412 entering the computer 422 from an unsecure network 426, e.g., the internet. For example, the network packet 432 may have been requested by the application 424. All received packets 432 must pass through the programmable packet filter 430 before they can be used by the program instructions 428 of the application 424. At this point, the nature of the network packet 432 is not known yet.

A pseudo-machine may be used by the programmable packet filter as configuration files in order to examine all of the incoming packets. The program for this pseudo-machine may be loaded from an external source, such as a file on disk or directly via the internet from a trusted source such as the application vendor. A typical computer system comprises a hardware processor which executes instructions stored in the computers memory. In contrast, a pseudo machine is an entirely logical entity where a set of virtual instructions are defined and executed by a "virtual" processor actually implemented as software instructions of the hardware processor. Typically the instructions the virtual processor understands are specific to some activity, such as packet filtering, compared to a hardware processor, where the instructions it understands are very generic low level activities, such as reading and writing from memory and performing arithmetic operations.

Figure 4C:
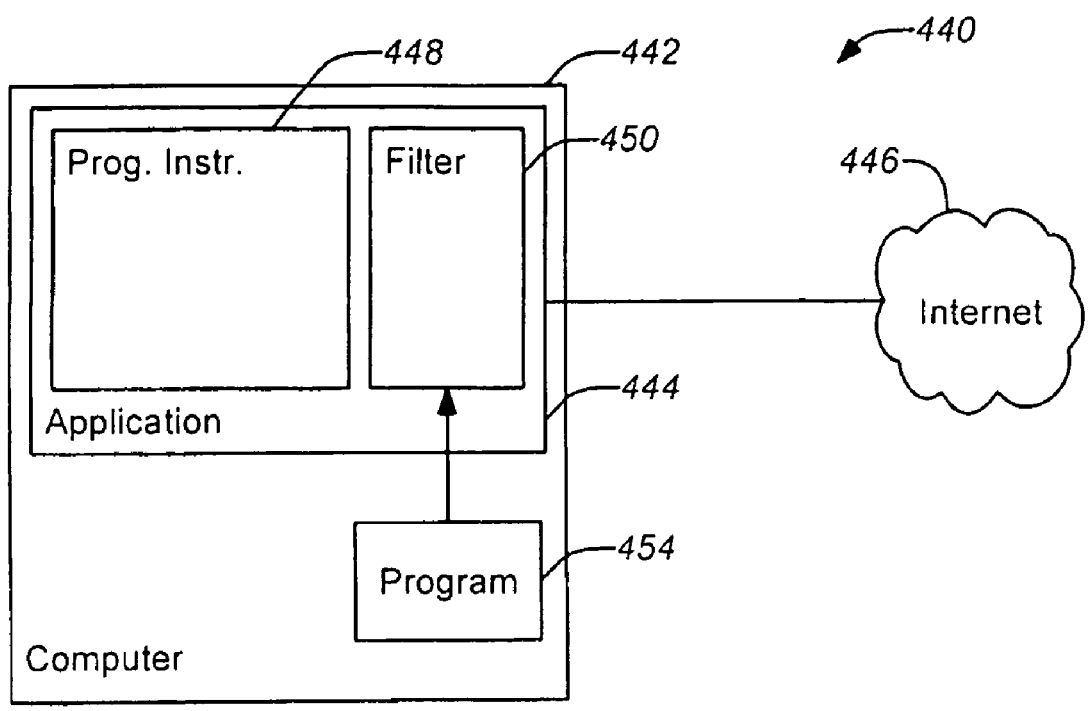
FIG. 4C illustrates the pseudo-machine program loading from the local disk.

FIG. 4C illustrates a computer system 440 and the loading of a pseudo-machine program 454 from the computer 442. The pseudo-machine program 454 gives instructions to the programmable packet filter 450 of the application 444 regarding how to filter packets and what packets to filter out (e.g., the digital signatures used to identify potentially malicious packets). The network packets are received from the internet 446 and used by the program instructions 448 of the application 444 if the programmable filter allows them to pass.

For additional security the pseudo-machine may be implemented in a separate process from the main application, but launched from the application. This allows privilege separation to be employed so the packet filter can run with minimal application privileges even if the main application has to run with administrator/root privileges. This provides additional protection for the application because any exploited vulnerability found in the packet filter itself will only be able to do minimal damage.

A pseudo-code instruction set may be designed that enables a pseudo-machine implemented in the application to parse all received network packets. For a stack based approach, the instruction set may be defined with an accumulator (a), a pointer into the received packet (p), a flag bit (f), push and pop instructions for the stack, a compare, compare greater and compare less than set of instructions, and an instruction to kill a packet. An example list of instructions are given below. Other implementations may use other instructions sets as will be apparent to those skilled in the art. This example implementation is stack based. Alternate implementations may be register to register, memory to memory or any other form of processor architecture as understood by those skilled in the art.

| | |
|---|---|
| push a | push a onto the stack |
| pop a | pop the top of the stack to a |
| push p | push p onto the stack |
| pop p | pop the top of the stack to p |
| ld a | Load a from address in packet given by p |
| ld a, #x | Load absolute value into a |
| ld p, #x | Load absolute value into p |
| cmp | set f if a is equalto the value on top of the stack |
| less | set f if a is less than the value on the top of the stack |
| greater | set f if a is greater than the value on the top of the stack |
| kill | if f is set kill packet and exit |
| pass | pass packet to application and exit |

A programmable packet filter can only be reliable if it has the most recent information (e.g., digital signatures) relating to new types of malicious packets. Program code designed to exploit vulnerabilities in an application or operating system is created constantly, and spread to many computers using network packets. The application vendor is able to keep the programmable packet filter updated by providing updates for the application to download. The updates may be loaded directly into the computer from any form of digital media or delivered through a network or over the internet as well or through any other known method of loading data into a computer. These updates include information regarding new packet filters to be used by the programmable packet filter.

Figure 4D:
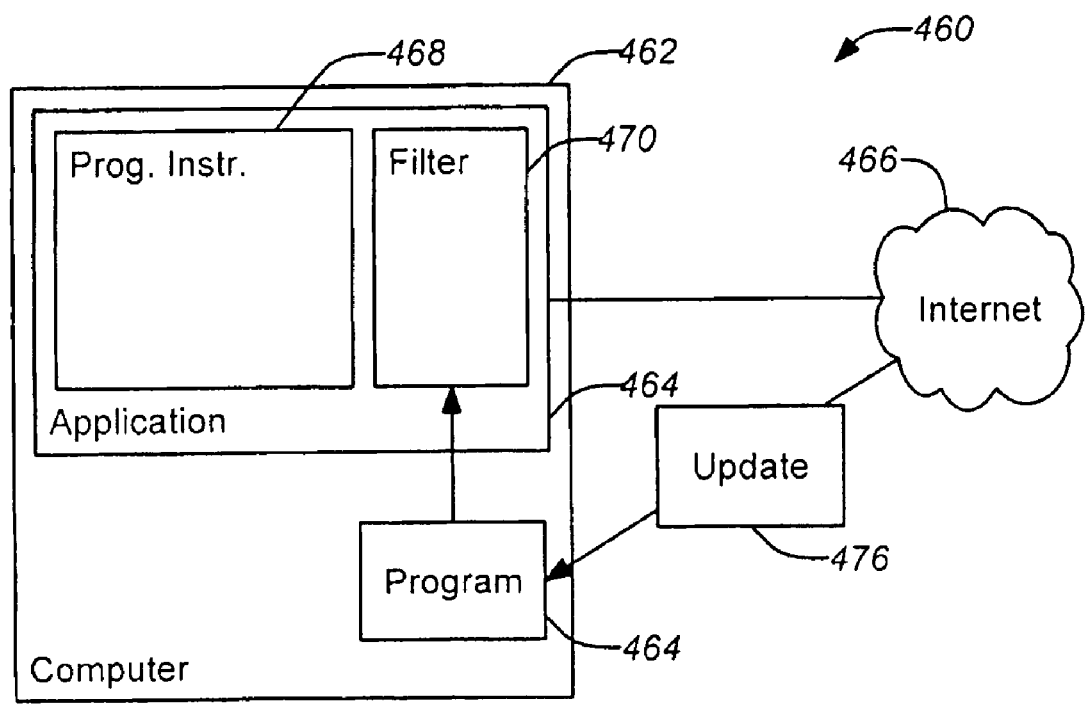
FIG. 4D illustrates the pseudo-machine program receiving an update from the application vendor.

FIG. 4D illustrates a computer system 460 and the pseudo-machine program 474 receiving an update 476 from the application vendor via the internet 466, as requested by the application 464. The update 476 includes the new filters having new digital signatures of potentially harmful code to be applied in scanning any incoming packets. The next time the pseudo-machine program 474 is loaded to the programmable packet filter 470 it will have the most recent filters available to apply to the incoming packets.

5. Method of Filtering Data Packets within an Application

Figure 5:
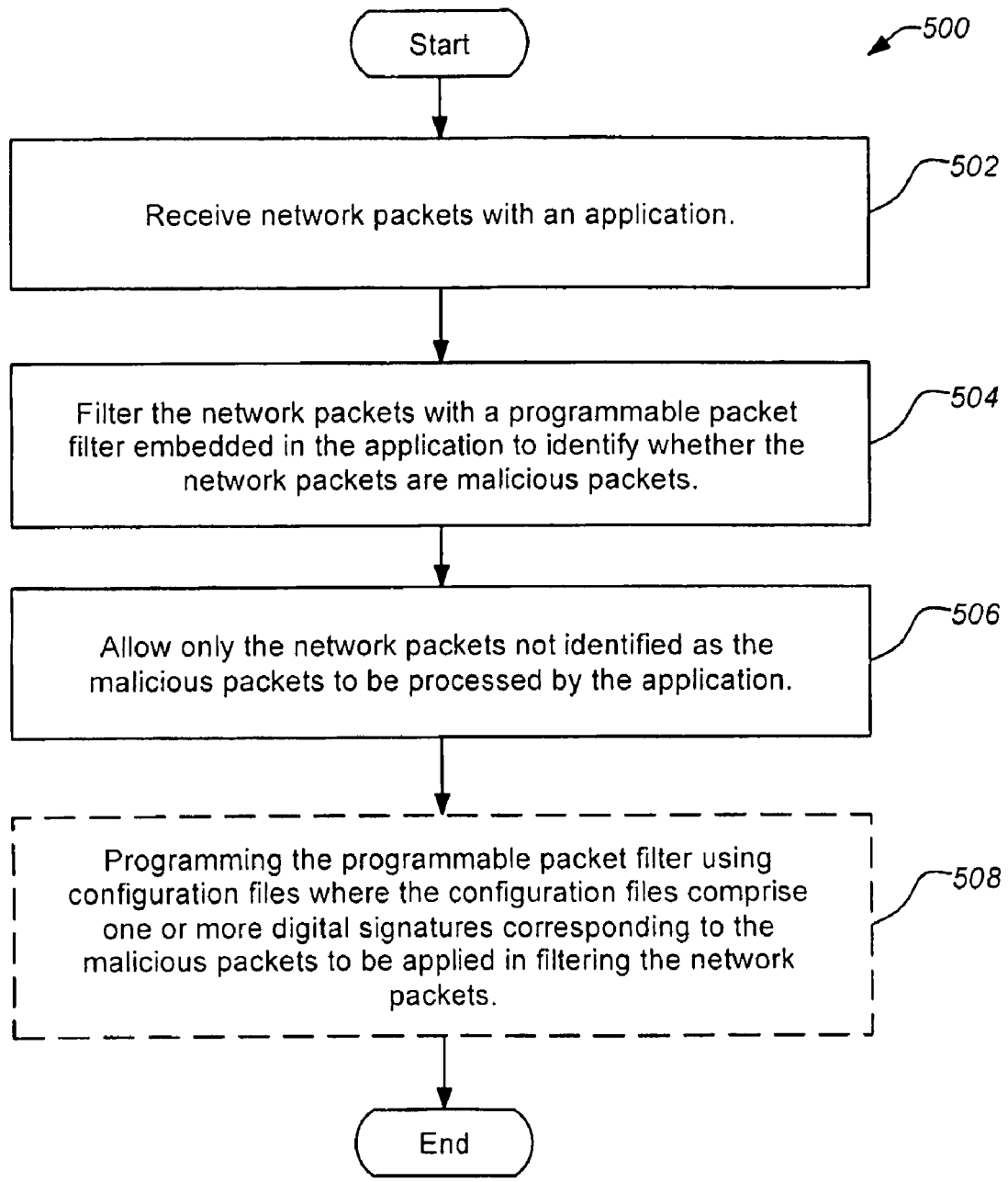
FIG. 5 is a flowchart of an exemplary method of filtering data packets within an application.

FIG. 5 is a flowchart of an exemplary method 500 of filtering data packets within an application. The method 500 begins with an operation 502 receiving network packets with an application. Next in operation 504, the network packets are filtered with a programmable packet filter embedded in the application to identify whether the network packets are malicious packets. Finally in operation 506, only the network packets not identified as the malicious packets are allowed to be processed by the application. Optionally, in step 508, the programmable packet filter may be programmed using configuration files where the configuration files comprise one or more digital signatures corresponding to the malicious packets to be applied in filtering the network packets. The configuration files may be loaded from an external source.

It should be noted that although optional operation 508 of programming using configuration is shown in FIG. 5 following operation 506 of only allowing network packets not identified as malicious packets to be processed, programming the filter using configuration files may occur at any time. For example, in an idealized scenario, the filter may be programmed with configuration files before any processing begins, i.e., before operation 502 of receiving packets. Alternately, the filter may be programmed with configuration files at least before the network packets are filtered in operation 504. However, in other scenarios, the basic process (i.e., operations 502 through 506) may be continuously performed and the configuration files are then applied in a "live" update at any time such that they only affect later received packets.

As such, no specific order for performing the programming of the filter with configuration files in operation 508 is required as will be understood by those skilled in the art.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A computer program embodied on a computer readable recording medium, comprising:
    program instructions for receiving network packets, the program instructions implemented within each of a plurality of applications;
    program instructions for filtering the network packets with a programmable packet filter embedded in each of the plurality of applications to identify whether the network packets are malicious packets; and
    program instructions for allowing only the network packets not identified as the malicious packets to be processed by each of the plurality of applications;
    wherein the program instructions for filtering include basic filtering rules, and one or more updatable signatures for determining if the network packets are malicious.

2. The computer program of claim 1, wherein filtering the network packets comprises examining the network packets for one or more digital signatures corresponding to the malicious packets.

3. The computer program of claim 1, wherein the programmable packet filter is implemented in a separate process from each of the plurality of applications, but launched from each of the plurality of applications.

4. The computer program of claim 1, further comprising program instructions for programming the programmable packet filter using configuration files.

5. The computer program of claim 4, wherein the configuration files comprise one or more digital signatures corresponding to the malicious packets to be applied in filtering the network packets.

6. The computer program of claim 4, wherein programming with the configuration files is implemented using a pseudo-machine program.

7. The computer program of claim 4, further comprising program instructions for loading the configuration files from an external source.

8. The computer program of claim 7, wherein the external source is connected to each of the plurality of applications via internet.

9. The computer program of claim 7, wherein the external source is connected to each of the plurality of applications via a local network.

10. A method, comprising:
    receiving, by a computer, network packets within each of a plurality of applications;
    filtering, by the computer, the network packets with a programmable packet filter embedded in each of the plurality of applications to identify whether the network packets are malicious packets; and
    allowing only the network packets not identified as the malicious packets to be processed by each of the plurality of applications;
    wherein the programmable packet filter includes basic filtering rules, and one or more updatable signatures for determining if the network packets are malicious.

11. The method of claim 10, wherein filtering the network packets comprises examining the network packets for one or more digital signatures corresponding to the malicious packets.

12. The method of claim 10, wherein the programmable packet filter is implemented in a separate process from each of the plurality of applications, but launched from each of the plurality of applications.

13. The method of claim 10, further comprising programming the programmable packet filter using configuration files.

14. The method of claim 13, wherein the configuration files comprise one or more digital signatures corresponding to the malicious packets to be applied in filtering the network packets.

15. The method of claim 13, wherein programming with the configuration files is implemented using a pseudo-machine program.

16. The method of claim 13, further comprising loading the configuration files from an external source.

17. The method of claim 16, wherein the external source is connected to each of the plurality of applications via interne.

18. The method of claim 16, wherein the external source is connected to each of the plurality of applications via a local network.

19. A system, comprising:
    a network connection for receiving network packets within each of a plurality of applications; and
    a processor for filtering the network packets with a programmable packet filter embedded in each of the plurality of applications to identify whether the network packets are malicious packets and allowing only the network packets not identified as the malicious packets to be processed by each of the plurality of applications;
    wherein the program packet filter includes basic filtering rules, and one or more updatable signatures for determining if the network packets are malicious.

20. The system of claim 19, further comprising a memory for storing configuration files for programming the programmable packet filter wherein the configuration files comprise one or more digital signatures corresponding to the malicious packets to be applied in filtering the network packets.

* * * * *